United States Patent
Kannan

(10) Patent No.: US 11,526,917 B2
(45) Date of Patent: Dec. 13, 2022

(54) METHOD AND APPARATUS FOR NOTIFYING CUSTOMERS OF AGENT'S AVAILABILITY

(71) Applicant: [24]7.ai, Inc., San Jose, CA (US)

(72) Inventor: Pallipuram V. Kannan, Saratoga, CA (US)

(73) Assignee: [24]7.ai, Inc., Campbell, CA (US)

( * ) Notice: Subject to any disclaimer, the term of this patent is extended or adjusted under 35 U.S.C. 154(b) by 463 days.

(21) Appl. No.: 15/933,305

(22) Filed: Mar. 22, 2018

(65) Prior Publication Data

US 2018/0276723 A1 Sep. 27, 2018

Related U.S. Application Data

(60) Provisional application No. 62/476,579, filed on Mar. 24, 2017.

(51) Int. Cl.
| | |
|---|---|
| *G06Q 30/02* | (2012.01) |
| *H04L 51/046* | (2022.01) |
| *H04L 51/04* | (2022.01) |
| *H04L 51/214* | (2022.01) |
| *H04L 51/224* | (2022.01) |
| *H04L 51/234* | (2022.01) |

(52) U.S. Cl.
CPC ......... *G06Q 30/0281* (2013.01); *H04L 51/04* (2013.01); *H04L 51/046* (2013.01); *H04L 51/214* (2022.05); *H04L 51/224* (2022.05); *H04L 51/234* (2022.05)

(58) Field of Classification Search
None
See application file for complete search history.

(56) References Cited

U.S. PATENT DOCUMENTS

| 8,781,103 B2 * | 7/2014 | Baranovsky | H04M 3/42059 |
| | | | 379/265.09 |
| 9,215,324 B2 * | 12/2015 | Dutta | H04M 3/5158 |
| 9,648,168 B2 * | 5/2017 | Petrovykh | H04L 65/1006 |

(Continued)

OTHER PUBLICATIONS

Forget Uber—Hilton and Argos are leading the Age of Intent; www.linkedin.com, 2016 (Year: 2016).*

*Primary Examiner* — Dennis W Ruhl
(74) *Attorney, Agent, or Firm* — Perkins Coie LLP; Michael Glenn

(57) ABSTRACT

A computer-implemented method and an apparatus for notifying customers of agent's availability is disclosed. An input indicative of a customer seeking an interaction with an agent of an enterprise is received on a first interaction channel. Subsequent to receiving the input, it is determined whether at least one agent is available for interacting with the customer. If no agent is available for interacting with the customer, a status message including an estimate of a waiting time for the interaction with the agent is provided to the customer. Subsequent to detecting the availability of the agent, a notification is provided to the customer for informing the customer of the availability of the agent. An interaction is facilitated between the customer and the agent subsequent to providing the notification to the customer. The interaction is facilitated on the first interaction channel or a second interaction channel different than the first interaction channel.

13 Claims, 7 Drawing Sheets

(56) References Cited

U.S. PATENT DOCUMENTS

| | | |
|---|---|---|
| 2005/0187802 A1 | 8/2005 | Koeppel |
| 2005/0187892 A1 | 8/2005 | Goutte et al. |
| 2015/0117632 A1 | 4/2015 | Konig et al. |
| 2015/0181040 A1 | 6/2015 | Ristock et al. |
| 2015/0254675 A1* | 9/2015 | Kannan ................. G06Q 30/02 705/304 |
| 2016/0065741 A1 | 3/2016 | Mezhibovsky et al. |
| 2016/0134754 A1 | 5/2016 | Petrovykh |
| 2016/0212265 A1* | 7/2016 | Philonenko ......... H04M 3/5183 |
| 2017/0116177 A1* | 4/2017 | Walia ..................... G06F 40/35 |

* cited by examiner

METHOD AND APPARATUS FOR NOTIFYING CUSTOMERS OF AGENT'S AVAILABILITY

CROSS REFERENCE TO RELATED APPLICATIONS

This application claims priority to U.S. provisional patent application Ser. No. 62/476,579, filed Mar. 24, 2017, which is incorporated herein in its entirety by this reference thereto.

TECHNICAL FIELD

The invention generally relates to interactions between customers and agents of an enterprise, and more particularly to a method and apparatus for notifying customers of agent's availability.

BACKGROUND

Enterprises may engage with existing and/or potential customers to draw the customer's attention towards a product or a service, to provide information about an event of customer interest, to offer incentives and discounts, to solicit feedback, to provide billing related information etc. Similarly, the customers may engage with the enterprises to enquire about products/services of interest, to resolve concerns, to make payments, to lodge complaints etc. The interactions may be conducted over a plurality of interaction channels, such as a Web channel, a voice channel, a chat channel, an interactive voice response (IVR) channel, a social media channel, a native mobile application channel and the like.

In many example scenarios, customers may wish to interact with a customer support representative, also referred to herein as an agent, and use a native application installed on the customer's electronic device to connect with the agent. Many times, an agent may not be available for interaction as the several agents deployed by the enterprise may be engaged in serving other customers. Many times, customers may have to wait indefinitely to connect to an agent and resolve respective concerns. Waiting for the interaction to commence can be very frustrating for the customer and can lead to the customer abandoning the interaction perhaps never to return.

Therefore, there is a need to facilitate customer interactions with agents while precluding frustrating interaction experiences for the customers and operating losses for the enterprises.

SUMMARY

In an embodiment of the invention, a computer-implemented method for notifying customers of agent's availability is disclosed. The method receives, by an apparatus, an input indicative of a customer seeking an interaction with an agent of an enterprise. The input is provided by the customer using a first interaction channel. Subsequent to receiving the input, the method determines by the apparatus, if at least one agent among a plurality of agents of the enterprise is available for interacting with the customer. If no agent is available for interacting with the customer, the method causes by the apparatus, a provisioning of a status message to the customer. The status message comprises an estimate of a waiting time for the interaction with the agent. Subsequent to the provisioning of the status message, the method tracks by the apparatus, availability of the at least one agent, the tracking performed for at least a time period equal to the estimate of the waiting time specified in the status message. Subsequent to detecting the availability of the agent, the method causes by the apparatus, a provisioning of a notification to the customer for informing the customer of the availability of the agent. The notification is provided using the first interaction channel or a second interaction channel different than the first interaction channel. The method facilitates the interaction between the customer and the agent by the apparatus subsequent to providing the notification to the customer. The interaction is facilitated on the first interaction channel or the second interaction channel.

In another embodiment of the invention, an apparatus for notifying customers of agent's availability is disclosed. The apparatus includes at least one processor and a memory. The memory stores machine executable instructions therein, that when executed by the at least one processor, causes the system to receive an input indicative of a customer seeking an interaction with an agent of an enterprise. The input is provided by the customer using a first interaction channel. Subsequent to receiving the input, the apparatus determines if at least one agent among a plurality of agents of the enterprise is available for interacting with the customer. If no agent is available for interacting with the customer, the apparatus is caused to provision a status message to the customer. The status message comprises an estimate of a waiting time for the interaction with the agent. Subsequent to the provisioning of the status message, the apparatus tracks availability of the at least one agent. The tracking is performed for at least a time period equal to the estimate of the waiting time specified in the status message. Subsequent to detecting the availability of the agent, the apparatus causes a provisioning of a notification to the customer for informing the customer of the availability of the agent. The notification is provided using the first interaction channel or a second interaction channel different than the first interaction channel. The apparatus facilitates the interaction between the customer and the agent subsequent to providing the notification to the customer. The interaction is facilitated on the first interaction channel or the second interaction channel.

In an embodiment of the invention, a computer-implemented method for notifying customers of agent's availability is disclosed. The method receives, by an apparatus, an input indicative of a customer seeking an interaction with an agent of an enterprise. The input is provided by the customer using a native mobile application on an electronic device associated with the customer. Subsequent to receiving the input, the method determines by the apparatus, if at least one agent among a plurality of agents of the enterprise is available for interacting with the customer. If no agent is available for interacting with the customer, the method causes by the apparatus, a provisioning of a status message to the customer in form of a spoken input. The status message comprises an estimate of a waiting time for the interaction with the agent. Subsequent to the provisioning of the status message, the method tracks by the apparatus, availability of the at least one agent. The tracking is performed for at least a time period equal to the estimate of the waiting time specified in the status message. Subsequent to detecting the availability of the agent, the method causes by the apparatus, a provisioning of a notification to the customer for informing the customer of the availability of the agent. The notification is provided using a different interaction channel than the native mobile application channel. The method facilitates, by the apparatus, display of a chat application user interface (UI) on a display screen of an electronic device associated with the customer for facilitating the interaction between the customer and the agent.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
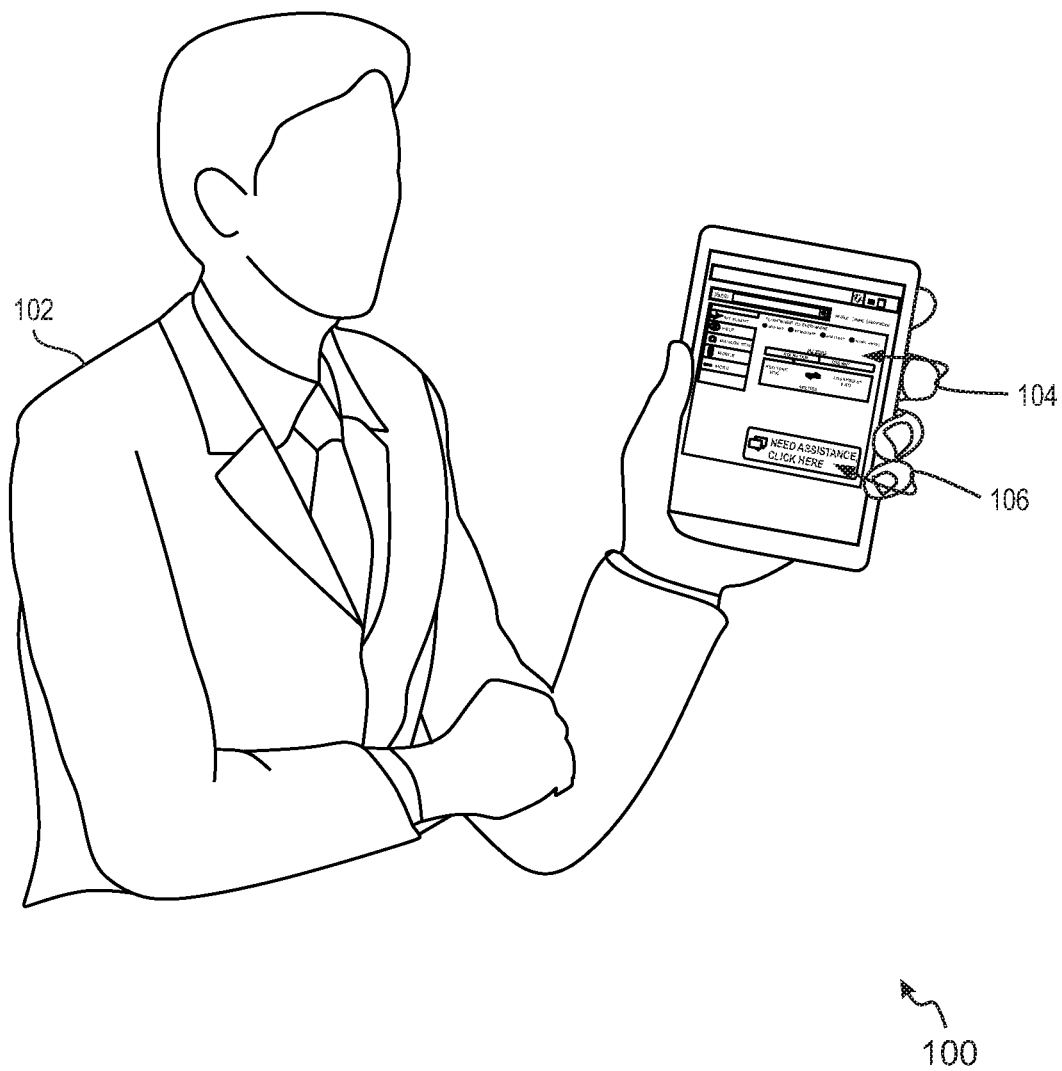
FIG. 1 is an example representation showing a customer using a native mobile application related to an enterprise to connect with a customer support representative of the enterprise, in accordance with an example scenario.

FIG. 1 is an example representation 100 showing a customer 102 using a native mobile application 104 related to an enterprise to connect with a customer support representative of the enterprise, in accordance with an example scenario. Most enterprises nowadays provide applications capable of being installed in the customer's electronic devices for connecting with the enterprise. The native mobile applications may be used by potential and existing customers to purchase enterprise products or services, view promotional offers or new launches from the enterprise, make payments, and the like. In some example scenarios, customers may wish to interact with a customer support representative of the enterprise. The customer support representatives of an enterprise are also referred to herein as agents. The customers may wish to interact with the agents for a variety of reasons, such as to receive additional information about a service, to troubleshoot a product feature, to resolve a billing dispute, and the like. The enterprise channels, such as the enterprise Websites and the native mobile applications typically facilitate interaction with an agent by displaying a widget, which upon being accessed by a customer enables a chat or, in some cases, a voice interaction, with the agent. Such a widget is displayed on the native mobile application 104 in form of a widget 106. The widget 106 is configured to display text 'Need Assistance, Click Here!' The customer 102 may provide a touch or a click input on the widget 106 to initiate an interaction, such as a chat interaction with the agent. Many times, an agent may not be available to chat with a customer as all the agents deployed by the enterprise may be engaged in serving other customers. In such a scenario, customers, such as the customer 102 may have to endure lengthy waiting period, which may frustrate the customer and the customer may abandon the interaction. If the customer had intended to purchase an enterprise offering and wished to interact with the agent prior to purchasing the offering, then an abandoned interaction may result in a loss of revenue for the enterprise.

Various embodiments of the present invention provide methods and apparatuses that are capable of overcoming these and other obstacles and providing additional benefits. More specifically, various embodiments of the present technology disclose techniques for notifying customers when the agent is available and thereby preclude the need for the customer to wait for the agent to be available. An apparatus configured to notify customers of the agent's availability is explained with reference to FIG. 2.

Figure 2:
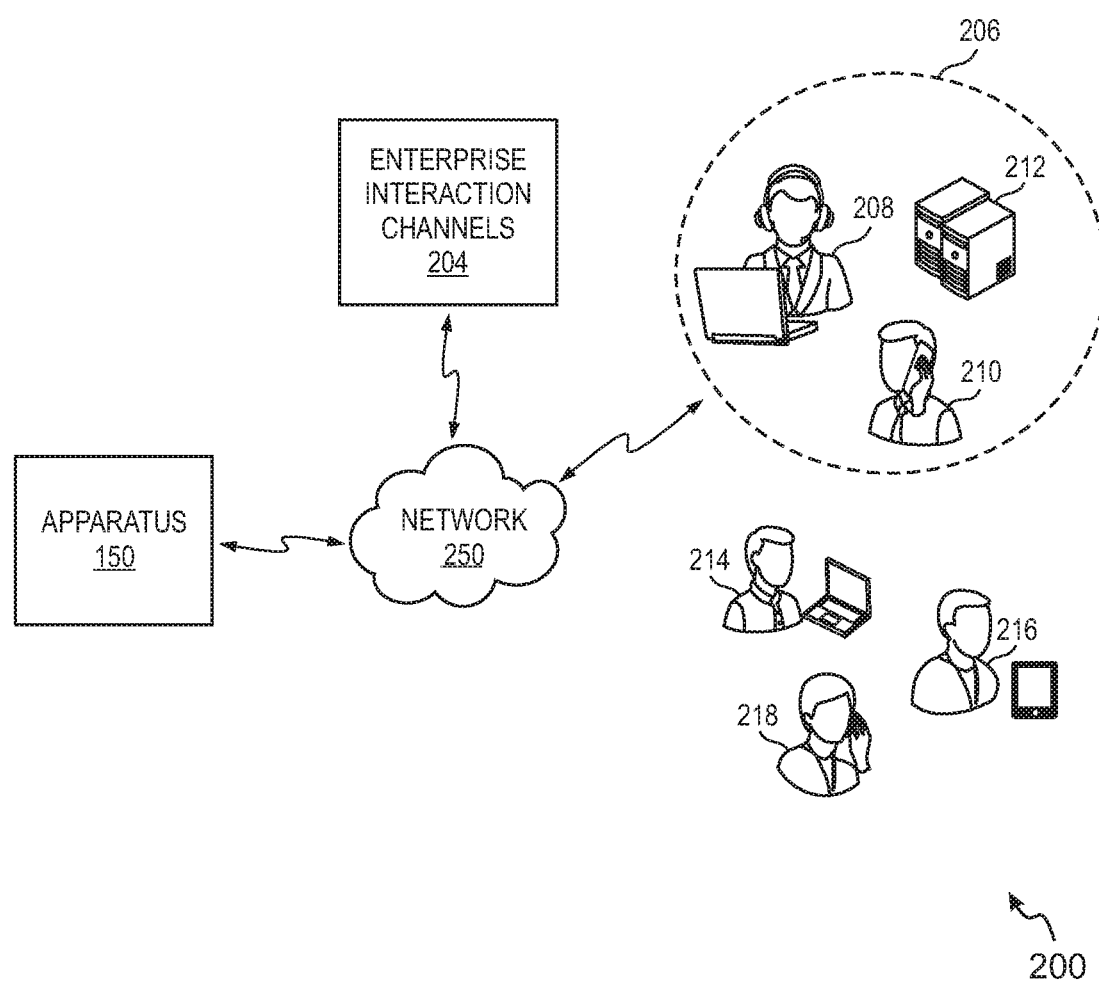
FIG. 2 is a representation showing an apparatus in operative communication with a plurality of remote entities, in accordance with an embodiment of the invention.

FIG. 2 is a representation 200 showing an apparatus 150 in operative communication with a plurality of remote entities, in accordance with an embodiment of the invention.

In at least one example embodiment, the apparatus 150, exemplarily depicted as a block in the representation 200, is embodied as a platform including a set of software layers on top of existing hardware systems. The apparatus 150 is configured to connect to a communication network, such as a network 250. The network 250 may be embodied as a wired communication network (for example, Ethernet, local area network (LAN), etc.), a wireless communication network (for example, a cellular network, a wireless LAN, etc.) or a combination thereof (for example, the Internet).

Using the network 250, the apparatus 150 is configured to be in operative communication with various enterprise interaction channels 204. As explained with reference to FIG. 1, an enterprise may offer various options to its customers to interact with the enterprise. For example, an enterprise may provide a website or a Web portal, i.e. a Web channel, to enable the customers to locate products/services of interest, to receive information about the products/services, to make payments, to lodge complaints, and the like. In another illustrative example, an enterprise may offer virtual agents to interact with the customers and enable self-service. In yet another illustrative example, an enterprise may offer dedicated customer sales and service representatives, such as live agents, to interact with the customers by engaging in voice conversations, i.e. use a speech interaction channel, and/or chat conversations, i.e. use a chat interaction channel. Similarly, the enterprises may offer other interaction channels such as an email channel, a social media channel, a native mobile application channel, and the like.

In the representation 200, a customer support facility 206 including human resources and machine-based resources for facilitating customer interactions is shown. The customer support facility 206 is exemplarily depicted to include two live agents 208 and 210 (who provide customers with chat-based/online assistance and voice-based assistance, respectively) and an automated voice response system, such as an IVR system 212. It is understood that the customer support facility 206 may also include automated chat agents such as chat bots, and other Web or digital self-assist mechanisms. Moreover, it is noted that the customer support facility 206 is depicted to include only two live agents 208 and 210 and the IVR system 212 for illustration purposes and it is understood that the customer support facility 206 may include fewer or more number of resources than those depicted in FIG. 2.

The representation 200 further depicts a plurality of customers, such as a customer 214, a customer 216 and a customer 218. As explained above, the term 'customers' as used herein includes both existing customers as well as potential customers of information, products and services offered by the enterprise. Moreover, the term 'customer' of the enterprise may include individuals, groups of individuals, other organizational entities etc. The term 'enterprise' as used throughout the description may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise. It is understood that three customers are depicted in FIG. 2 for example purposes and that the enterprise may be associated with many such customers. In some example scenarios, the customers 214, 216 and 218 may browse the website and/or interact with the resources deployed at the customer support facility 206 over the network 250 using their respective electronic devices. Examples of such electronic devices may include mobile phones, smartphones, laptops, personal computers, tablet computers, personal digital assistants, smart watches, web-enabled wearable devices and the like.

The apparatus 150 is configured to be in operative communication with the customer support facility 206 through the network 250. More specifically, the apparatus 150 may be in operative communication with devices of individual agents, with IVR systems, with chat bots and/or with server mechanisms monitoring the electronic devices deployed at the customer support facility 206. In at least one example embodiment, on account of such operative communication, the apparatus 150 may be configured to track availability of the agent in substantially real-time. Moreover, in some embodiments, the apparatus 150 may also receive transcripts of conversations between the agents and the customers in substantially real-time.

The apparatus 150 is further configured to be in operative communication with devices of the customers. For example, the apparatus 150 may be configured to be in operative communication with the enterprise native mobile applications installed in the devices of the customers and also with related applications, such as Virtual Assistants (VAs) deployed in the devices of the customers.

The apparatus 150 is configured to notify customers of agent's availability. The term 'notifying a customer of an agent's availability' as used herein implies intimating a customer that an agent is now available for an interaction. The customer may have sought interaction with an agent and sometimes, the agent may not have been available for interaction. In such a scenario, a status message indicative of an estimate of a waiting time may be provided to the customer. The customer may thereafter proceed to perform any other task on the same or different device/channel. When the agent is available, a notification may be provided to the customer on a device/channel in which the customer is currently attentive and the customer may thereafter interact with the agent to receive desired assistance. The effecting of notification of agent's availability to the customers is further explained in detail with reference to various components of the apparatus 150 in FIG. 3.

Figure 3:
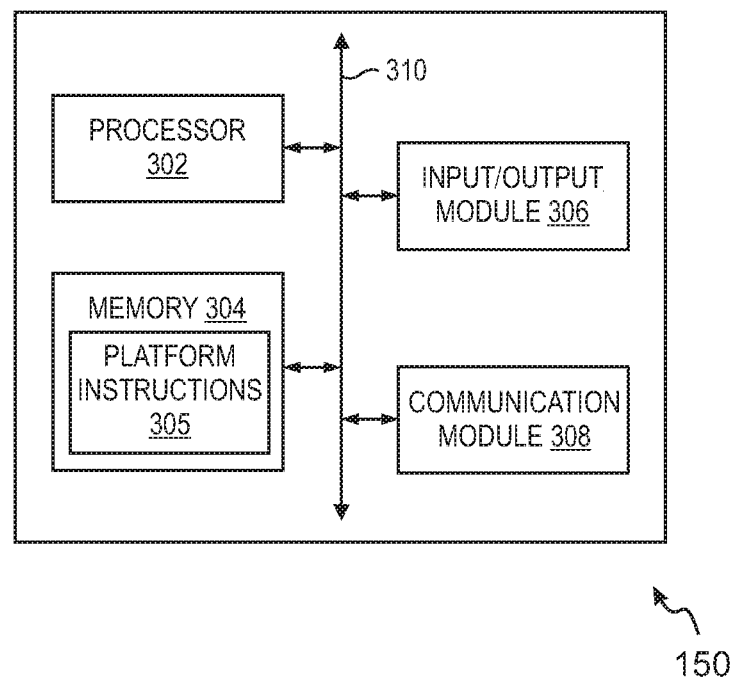
FIG. 3 is a block diagram of the apparatus configured to notify customers of agent's availability, in accordance with an embodiment of the invention.

FIG. 3 is a block diagram of the apparatus 150 configured to notify customers of agent's availability, in accordance with an embodiment of the invention.

The apparatus 150 includes at least one processor, such as a processor 302 and a memory 304. It is noted that although the apparatus 150 is depicted to include only one processor, the apparatus 150 may include more number of processors therein. In an embodiment, the memory 304 is capable of storing machine executable instructions, referred to herein as platform instructions 305. Further, the processor 302 is capable of executing the platform instructions 305. In an embodiment, the processor 302 may be embodied as a multi-core processor, a single core processor, or a combination of one or more multi-core processors and one or more single core processors. For example, the processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 302 may be configured to execute hard-coded functionality. In an embodiment, the processor 302 is embodied as an executor of software instructions, wherein the instructions may specifically configure the processor 302 to perform the algorithms and/or operations described herein when the instructions are executed.

The memory 304 may be embodied as one or more volatile memory devices, one or more non-volatile memory devices, and/or a combination of one or more volatile memory devices and non-volatile memory devices. For example, the memory 304 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

In at least some embodiments, the memory 304 is configured to store instructions for configuring status messages and notifications to be sent to the customers. The status messages, as will be explained in detail later, are configured to provide an estimate of a waiting time for the customer to engage in an interaction with the agent. As such, the instructions for configuring each status message may include instructions to include an estimate of the waiting time, which may be derived from the real-time availability status of agents and historic conversation wrap-up times of respective agents. The notifications, as will be explained in detail later, are configured to inform the respective customers that an agent is now available for interaction. As such, the instructions for configuring each notification may include instructions to take customer preferences related to receiving notifications into account. Some examples of the customer preferences for receiving notifications include preference of a medium, such as a preferred interaction channel or preferred device for receiving notifications, a preference of voice notification or a preference of receiving text or email notifications, a preference of a time of the day for receiving notifications, and the like.

In at least some embodiments, the memory 304 may include a database (not shown in FIG. 3) configured to store customer identification data as well as interaction data related to current and past journeys of the customer on various customer interaction channels. The database may also be configured to store text mining and intention prediction models as classifiers. Some examples of such models include models based on logistic regression, artificial neural network (ANN), Support Vector Machine (SVM) with Platt scaling, and the like. The classifiers may be used to predict intention of each customer for requesting an interaction with the agent.

The apparatus 150 also includes an input/output module 306 (hereinafter referred to as 'I/O module 306') and at least one communication module such as a communication module 308. In an embodiment, the I/O module 306 may include mechanisms configured to receive inputs from and provide outputs to the user of the apparatus 150. For example, the I/O module 306 may enable the user to provide text snippets, which may be used to configure status messages and notifications. To enable reception of inputs and provide outputs to the user of the apparatus 150, the I/O module 306 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 302 may include I/O circuitry configured to control at least some functions of one or more elements of the I/O module 306, such as, for example, a speaker, a microphone, a display, and/or the like. The processor 302 and/or the I/O circuitry may be configured to control one or more functions of the one or more elements of the I/O module 306 through computer program instructions, for example, software and/or firmware, stored on a memory, for example, the memory 304, and/or the like, accessible to the processor 302.

The communication module 308 is configured to facilitate communication between the apparatus 150 and one or more remote entities over a communication network, such as the network 250 explained with reference to FIG. 2. For example, the communication module 308 may enable communication between the apparatus 150 and customer support facilities, such as the customer support facility 206 shown in FIG. 2. Further, the communication module 308 may include several channel interfaces to receive information from a plurality of enterprise interaction channels. In at least some embodiments, the communication module 308 may include relevant Application Programming Interfaces (APIs) to communicate with remote data gathering servers associated with such enterprise interaction channels over the network 250. Each channel interface may further be associated with a respective communication circuitry such as for example, a transceiver circuitry including antenna and other communication media interfaces to connect to the network 250. The communication circuitry associated with each channel interface may, in at least some example embodiments, enable transmission of data signals and/or reception of signals from remote network entities, such as Web servers hosting enterprise Website or a server at a customer support facility configured to maintain real-time information related to interactions between customers and enterprises.

In at least one example embodiment, the channel interfaces are configured to receive information related to a plurality of customers of an enterprise, for example enterprise 'E'. To that effect, at least one channel interface may be operatively coupled with remote data gathering servers, for receiving up-to-date information on the customers and their enterprise related interaction activity. The remote data gathering servers may collate information from a plurality of channels and/or a plurality of devices utilized by the customers for interacting with the enterprise 'E'. For example, the remote data gathering servers may be in operative communication with various customer touch points, such as the electronic devices associated with the customers, Website and/or the native mobile application of enterprise 'E' visited by the customers, the customer support representatives (for example, voice-agents, chat-agents, IVR systems and the like, associated with the enterprise 'E') engaged by the customers and the like.

In an embodiment, the information received for each customer includes profile data and journey data corresponding to that customer. The profile data may include profile information related to the customer, such as for example, a customer's name and contact details, information relating to products and services associated with the customer, social media account information, information related to other messaging or sharing platforms used by the customer, recent transactions, customer interests and preferences, customer's credit history, history of bill payments, credit score, memberships, history of travel, and the like. In some exemplary embodiments, the customer information may also include calendar information associated with the customer. For example, the calendar information may include information related to an availability of the customer during the duration of the day/week/month.

In an embodiment, journey data received corresponding to the customer may include information such as enterprise 'E' related Web pages visited, queries entered, chat entries, purchases made, exit points from websites visited, or decisions made, mobile screens touched, work flow steps completed, sequence of steps taken, engagement time, IVR speech nodes touched, IVR prompts heard, widgets/screens/buttons selected or clicked, historical session experience and results, customer relationship management (CRM) state and state changes, agent wrap-up notes, speech recordings/transcripts, chat transcripts, survey feedback, channels touched/used, sequence of channels touched/used, instructions, information, answers, actions given/performed by either enterprise system or agents for the customer, and the like. In some example scenarios, the journey data may include information related to past interactions of the customer with resources at a customer support facility, the types of channels used for interactions, customer channel preferences, types of customer issues involved, whether the issues were resolved or not, the frequency of interactions and the like.

The channel interfaces of the communication module 308 may be configured to receive such information related to the customers in real-time or on a periodic basis. Moreover, the information may be received by the communication module 308 in an online mode or an offline mode. In an embodiment, the communication module 308 provides the received information to the database in the memory 304 for storage purposes. In an embodiment, the information related to each customer is labeled with some customer identification information (for example, a customer name, a unique ID and the like) prior to storing the information in the database.

In an embodiment, the apparatus 150 may be configured to be in operative communication with third-party interaction mediums through the communication module 308. The term 'third-party' as used herein refers to an entity that is not related to the enterprise 'E' linked to the apparatus 150. For example, the apparatus 150 may be linked with an organization involved in assisting travelers to book airline reservations. Any enterprise not linked with such an organization may be deemed third-party by the apparatus 150. Accordingly, the third-party interaction mediums may include the entire gamut of websites/applications barring those linked with enterprises associated with the apparatus 150. In an illustrative scenario, an example of a third-party website may be a website related to a search engine such as Google®, Yahoo®, Bling® and the like. Another example of a third-party website may be a social networking website such as Facebook®, Google Circles®, and the like. An example of the third-party application may be a device OS based virtual assistant, such as Siri®, Google Now®, Cortana® and the like. Another example of the third-party application may be a messaging platform, such as Facebook Chat™, Gtalk™, WhatsApp™ and the like. Yet another example of a third-party application may be a native mobile device application installed on the customer device.

The various components of the apparatus 150, such as the processor 302, the memory 304, the I/O module 306 and the communication module 308 are configured to communicate with each other via or through a centralized circuit system 310. The centralized circuit system 310 may be various devices configured to, among other things, provide or enable communication between the components (302-308) of the apparatus 150. In certain embodiments, the centralized circuit system 310 may be a central printed circuit board (PCB) such as a motherboard, a main board, a system board, or a logic board. The centralized circuit system 310 may also, or alternatively, include other printed circuit assemblies (PCAs) or communication channel media.

It is noted that the apparatus 150 as illustrated and hereinafter described is merely illustrative of an apparatus that could benefit from embodiments of the invention and, therefore, should not be taken to limit the scope of the invention. It is noted that the apparatus 150 may include fewer or more components than those depicted in FIG. 3. In an embodiment, one or more components of the apparatus 150 may be deployed in a Web Server. In another embodiment, the apparatus 150 may be a standalone component in a remote machine connected to a communication network and capable of executing a set of instructions (sequential and/or otherwise) to notify customers of agent's availability. Moreover, the apparatus 150 may be implemented as a centralized system, or, alternatively, the various components of the apparatus 150 may be deployed in a distributed manner while being operatively coupled to each other. In an embodiment, one or more functionalities of the apparatus 150 may also be embodied as a client within devices, such as customer's devices. In another embodiment, the apparatus 150 may be a central system that is shared by or accessible to each of such devices.

In at least one example embodiment, the communication module 308 of the apparatus 150 receives an input indicative of a customer seeking an interaction with an agent of an enterprise. The input may be provided by the customer using a first interaction channel. In one embodiment, the first interaction channel corresponds to a native mobile application associated with the enterprise. In one embodiment, the first interaction channel corresponds to an enterprise Website. In case of the first interaction channel being a native mobile application or an enterprise Website, the input may be embodied as a touch or a click input on a widget, such as the widget 106 shown in FIG. 1. In one embodiment, the first interaction channel corresponds to a voice channel. For example, the customer may provide a spoken input to a Virtual Assistant (VA) on the customer's electronic device to seek agent assistance. The input provisioned by the customer may be received by the communication module 308 on account of being operatively coupled with the enterprise interaction channels (such as Websites, native mobile applications, etc.) and third-party interaction mediums (such as the Virtual Assistants (VAs), messaging applications, and the like). The communication module 308 may be configured to provision the received input to the processor 302.

In at least one example embodiment, the processor 302 may be configured to facilitate an interaction between the customer and the agent. To that effect, in at least one example embodiment, the processor 302 may include a plurality of modules capable of facilitating interaction between the customer and the agent. The modules of the processor 302 are depicted in FIG. 4.

Figure 4:
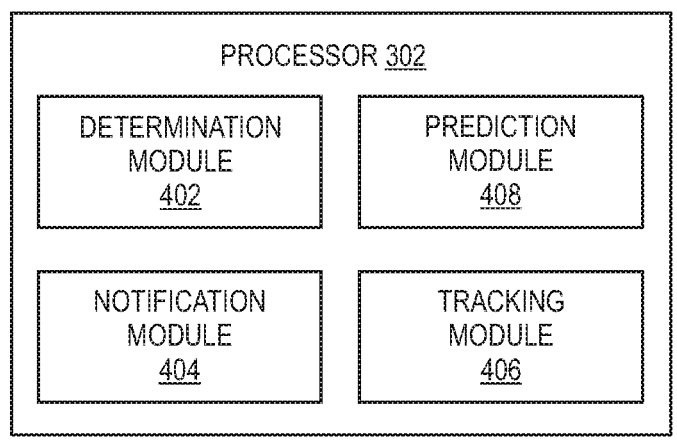
FIG. 4 shows a block diagram of the processor of the apparatus of FIG. 3, in accordance with an embodiment of the invention.

FIG. 4 shows a block diagram of the processor 302 of the apparatus 150 of FIG. 3, in accordance with an embodiment of the invention. The processor 302 is depicted to include a determination module 402, a notification module 404, a tracking module 406 and a prediction module 408. The various modules of the processor 302 may be implemented using software, hardware, firmware or a combination thereof. It is noted that in some example embodiments, the processor 302 may preclude the various modules and is configured to perform all the functions that are collectively performed by the determination module 402, the notification module 404, the tracking module 406 and the prediction module 408. It is also noted that various modules of the processor 302 are depicted herein for example purposes and that the processor 302 may include fewer or more modules than those depicted in FIG. 4.

In at least one example embodiment, the input received by the communication module 308 may be forwarded to the determination module 402. Subsequent to receiving such an input, the determination module 402 is configured to determine if at least one agent among a plurality of agents of the enterprise is available for interacting with the customer.

In some embodiments, prior to determination of the availability of an agent, the prediction module 408 is configured to predict an intention of the customer for seeking an interaction with the agent. For predicting an intention of the customer, in at least some embodiments, the prediction module 408 is configured to retrieve interaction data, such as information related to current journey and past journeys of the customer on interaction channels associated with the enterprise. As explained with reference to FIGS. 2 and 3, the communication module 308 on account of being in operative communication with enterprise interaction channels receives information related to customer interactions on various enterprise interaction channels. For example, the customer's current or past journey on the enterprise website may be associated with the interaction data including information such as web pages visited, time spent on each Web page, menu options accessed, drop-down options selected or clicked, mouse movements, hypertext mark-up language (HTML) links those which are clicked and those which are not clicked, focus events (for example, events during which the customer has focused on a link/webpage for a more than a pre-determined amount of time), non-focus events (for example, choices the customer did not make from information presented to the customer (for examples, products not selected) or non-viewed content derived from scroll history of the visitor), touch events (for example, events involving a touch gesture on a touch-sensitive device such as a tablet), non-touch events and the like. For example, the customer's current or past journey on the chat interaction channel may be associated with the interaction data including information such as type of customer concern, which agent handled the chat interaction, customer concern resolution status, time involved in the chat interaction and the like.

The prediction module 408 is configured to transform or convert the interaction data into a more meaningful or useful form. In an illustrative example, the transformation of the interaction data may include normalization of content included therein. In at least one example embodiment, the normalization of the content is performed to standardize spelling, dates and email addresses, disambiguate punctuation, etc. In some embodiments, the prediction module 408 may also be caused to normalize word classes, URLs, symbols, days of week, digits, and so on. Some non-exhaustive examples of the operations performed by the prediction module 408 for normalization of content include converting all characters in the text data to lowercase letters, stemming, stop-word removal, spell checking, regular expression replacement, removing all characters and symbols that are not letters in the English alphabet, substituting symbols, abbreviations, and word classes with English words, and replacing two or more space characters, tab delimiters, and newline characters with a single space character etc. It is noted that normalization of content is explained herein using text categorization models for illustration purposes only, and that various models may be deployed for normalization of content, which include a combination of structured and unstructured data.

In an embodiment, the transformation of the information may also involve clustering of content included therein. At least one clustering algorithm from among K-means algorithm, a self-organizing map (SOM) based algorithm, a self-organizing feature map (SOFM) based algorithm, a density-based spatial clustering algorithm, an optics clustering based algorithm and the like, may be utilized for clustering of information included in the interaction data.

In an embodiment, the prediction module 408 is further configured to extract features from the transformed data to look for occurrences of contiguous sequences of words in n-gram based features. The n-gram based features may include three unigrams in which words a, b, and c occur, two bi-grams in which two pairs of words occur, one tri-gram in which three specific single words occur, and the like. Types of features can include co-occurrence features where words are not contiguous but co-occur in, for example, a phrase. In some embodiments, the prediction module 408 may also be configured to perform weighting of features.

The generated feature vectors from the transformed interaction data are then provided to at least one classifier (i.e. an algorithmic model) associated with intention prediction to facilitate prediction of the customer's intention in seeking an interaction with the agent. In at least one example embodiment, the memory 304 is configured to store one or more text mining and intention prediction models as classifiers. The prediction module 408 of the apparatus 150 may be caused to provision the feature vectors generated upon transformation of the interaction data to the classifiers to facilitate prediction of customer's intention.

The feature vectors provisioned to the classifiers may include, but are not limited to, any combinations of word features such as n-grams, unigrams, bigrams and trigrams, word phrases, part-of-speech of words, sentiment of words, sentiment of sentences, position of words, customer keyword searches, customer click data, customer web journeys, cross-channel journeys, the customer interaction history and the like. In an embodiment, the classifiers may utilize any combination of the above-mentioned input features to predict the customer's likely intent. In an embodiment, an intention predicted for the customer corresponds to an outcome (such as for example a 'YES' or a 'No' outcome or even a 'High' or a 'Low' outcome) related to one of a probable customer concern. Further, in at least one example embodiment, the outcome may be associated with a likelihood measure. For example, an outcome of prediction of the customer's intention to seek an interaction with an agent for a billing related issue, may be 'Yes' and may further associated with a likelihood measure of '0.85' indicative of 85% likelihood of the customer seeking an interaction for such an issue.

In an illustrative example, a customer may browse an enterprise website and proceed towards purchasing a product by adding the product to the cart. During billing, the customer may have some issue while completing the transaction and accordingly, the customer may seek an interaction with the agent. Based on the interaction data related to customer's current journey on the website (for example, visit to the checkout page, etc.), the customer's intention may be predicted to be a billing related issue. In another illustrative example, a customer may have recently purchased a flight ticket. Based on the past transaction and current journey of the customer on a native mobile application, the customer's intention may be predicted to be a rescheduling or a trip cancellation issue.

In at least one example embodiment, the prediction module 408 is further configured to identify an agent type suitable for handling the interaction with the customer based on the predicted intention of the customer. The suitable agent type may correspond to an agent type associated with specialized skill in handling interactions related to the intention of the customer. For example, if the customer is predicted to be seeking an interaction with the agent for a billing related issue, then the prediction module is configured to identify an agent who has specialized skill in handling billing issues. In another illustrative example, if the customer's intention is predicted to be rescheduling or cancellation of a flight, then an agent who has specialized skill in assisting customers with such needs may be identified.

In some embodiments, the suitable agent type may correspond to an agent type associated with persona matching a persona of the customer. The term 'persona' or 'persona type' as used interchangeably hereinafter refers to characteristics reflecting behavioral patterns, goals, motives and personal values of an individual. It is noted that 'personas' as used herein is distinct from the concept of user profiles, that are classically used in various kinds of analytics, where similar groups of customers are identified based on certain commonality in their attributes, which may not necessarily reflect behavioral similarity, or similarity in goals and motives. An example of a customer persona type may be a 'convenience customer' that corresponds to a group of customers characterized by the behavioral trait that they are focused and are looking for expeditious delivery of service. In an embodiment, a behavioral trait as referred to herein corresponds to a biological, sociological or a psychological characteristic. An example of a psychological characteristic may be a degree of decidedness associated with a customer while making a purchase. For example, some customers dither for a long time and check out various options multiple times before making a purchase, whereas some customers are more decided in their purchasing options. An example of a sociological characteristic may correspond to a likelihood measure of a customer to socialize a negative sentiment or an experience. For example, a customer upon having a bad experience with a product purchase may share his/her experience on social networks and/or complain bitterly on public forums, whereas another customer may choose to return the product and opt for another product, while precluding socializing his/her experience. An example of a biological characteristic may correspond to gender or even age-based inclination towards consumption of products/services or information. For example, a middle-aged female may be more likely to purchase a facial product associated with ageing, whereas a middle-aged man may be more likely to purchase a hair care related product. It is understood that examples of customer biological, sociological and psychological characteristics are provided herein for illustrative purposes and may not be considered limiting the scope of set of behavioral traits associated with a persona type and that each person type may include one or more such behavioral traits. The prediction module 408 is configured to identify the persona type of the customer based on collated data corresponding to the customer. Accordingly, an agent of agent type associated with persona matching the persona of the customer may be identified to be suitable for interacting with the customer.

Further, as explained above, the communication module 308 is in operative communication with the agent's devices and/or the servers deployed at the customer support facilities and, accordingly, the determination module 402 of the apparatus 150 may utilize the communication module 308 to communicate with the customer support facility to determine agent availability in substantially real-time. For example, the determination module 402 may seek to determine availability of an agent of suitable agent-type as explained above. If an agent is available for interaction, then in response to the customer's input seeking interaction with an agent, a chat application UI may be displayed to the customer for facilitating chat interaction between the customer and the agent. The display of the chat application UI and facilitating of the chat interaction is explained later with reference to FIG. 7.

However, in many example scenarios, an agent may not be available for interaction with the customer. If no agent is available for interacting with the customer, the notification module 404 may be configured to cause provisioning of a status message to the customer. In one embodiment, the status message includes an estimate of a waiting time for the interaction with the agent. More specifically, the status message is configured to provide an estimate of time at which an agent will be available for interacting with the customer. In one embodiment, the status message may be provided as a text-based message on the customer's device screen. Alternatively, in some embodiments, the VA may take over the communication and provide a spoken input to the customer informing the customer of the current unavailability of the agent. Such a scenario is exemplarily depicted in FIG. 5.

Figure 5:
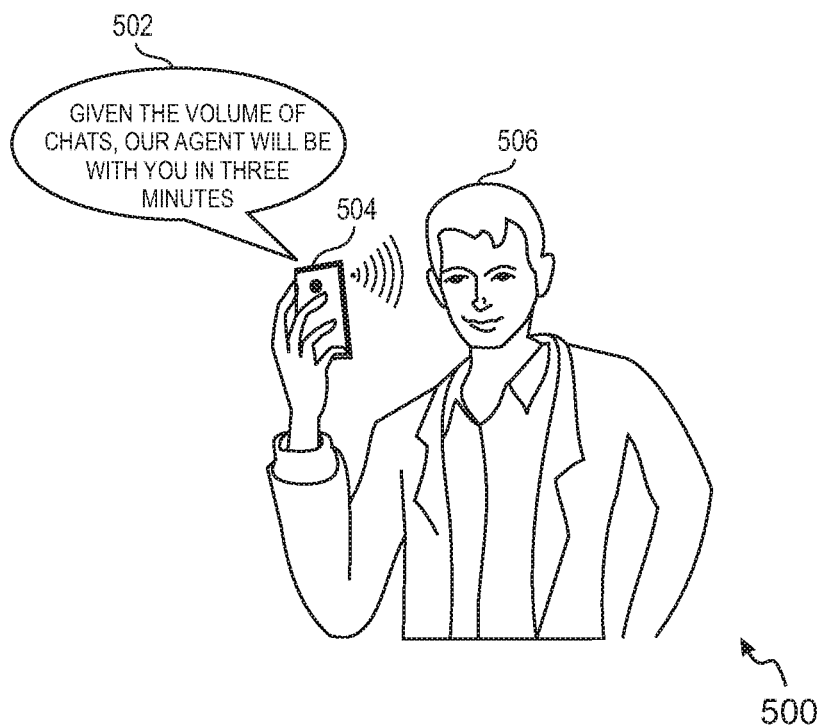
FIG. 5 shows an example representation illustrating a provisioning of a status message to a customer by a virtual assistant (VA) in a customer's device, in accordance with an embodiment of the invention.

Referring now to FIG. 5, an example representation 500 illustrating a provisioning of a status message 502 to a customer 506 by a virtual assistant (VA) in a customer's device 504 is shown, in accordance with an example embodiment. As explained above, the notification module 404 subsequent to determining an agent's unavailability by the determination module 402 is configured to generate a status message. Moreover, the communication module 308 may be configured to cause provisioning of a status message 502 to the customer 506. On account of being operatively coupled with the customer's device VA, the communication module 308 may provision the status message 502 using the VA in the customer's device 504. As explained with reference to FIG. 4, the status message includes an estimate of a waiting time for the interaction with the agent. As an example, the status message 502 is configured to exemplarily include the content 'Given the volume of chats our agent will be with you in three minutes'. More specifically, the estimate of the waiting time is depicted as three minutes for illustration purposes. It is understood the waiting time estimate may vary depending on the number of agents and the volume of interactions handled by each agent at a customer support facility.

It is noted that the provisioning of the status message in form of spoken input to the customer 506 by the VA is depicted herein for illustration purposes. In at least some embodiments, the status message may be provisioned using any other medium, such as for example a text medium. For example, the status message 502 may be provisioned as a Short Message Service (SMS) or as an Email communication to the customer 506. Alternatively, the status message 502 may also be embodied as a pop-up message or a widget and displayed on the interaction channel using which the customer requested an interaction (for example, the native mobile application) or on an interaction channel in which the customer is currently active, such as for example on a Website.

Referring now to FIG. 4, in at least some embodiments, subsequent to provisioning of the status message, the tracking module 406 is configured to track availability of at least one agent for at least a time period equal to the estimate of the waiting time specified in the status message. For example, if the estimate of the waiting time specified in the status message is three minutes, then the tracking module 406 may be configured to track the availability of the agent (for example, an agent of suitable agent type) for at least three minutes. In at least some embodiments, the availability of the agent may be continued to be tracked till an agent is available. Further, if the agent may only be available after a time period greater than the estimate of the waiting time specified in the status message, then another status message may be provisioned to the customer to inform the customer of the additional time required for the interaction to be initiated.

In at least one example embodiment, subsequent to detecting the availability of the agent, the notification module 404 may be configured to cause a provisioning of a notification to the customer for informing the customer of the availability of the agent. The notification may be provided using the first interaction channel or a second interaction channel different than the first interaction channel An example notification provided to the customer upon detecting agent's availability is explained with an illustrative example in FIG. 6.

Figure 6:
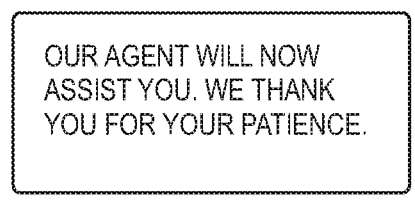
FIG. 6 shows an example notification provided to the customer upon detecting an agent's availability, in accordance with an embodiment of the invention.

Referring now to FIG. 6, an example notification 600 provided to the customer upon detecting an agent's availability is shown, in accordance with an embodiment of the invention. The notification 600 is depicted to include content: 'Our agent will now assist you. We thank you for your patience'. Such a notification may be provided in a textual form as a Short Message Service (SMS) or as a pop-up on the customer's device screen. In some embodiments, the VA may be configured to provision the notification 600 as a speech input to the customer.

Referring now to FIG. 4, upon provisioning of such a notification, in at least one example embodiment, the notification module 406 may be configured to facilitate interaction between the customer and the agent. The interaction is facilitated on the first interaction channel or the second interaction channel. For example, the notification module 404 may be configured to use the communication module 308 to cause display of a chat application user interface (UI) on a display screen of an electronic device associated with the customer for facilitating the interaction between the customer and the agent. An example chat application UI displayed to the customer is shown in FIG. 7.

Figure 7:
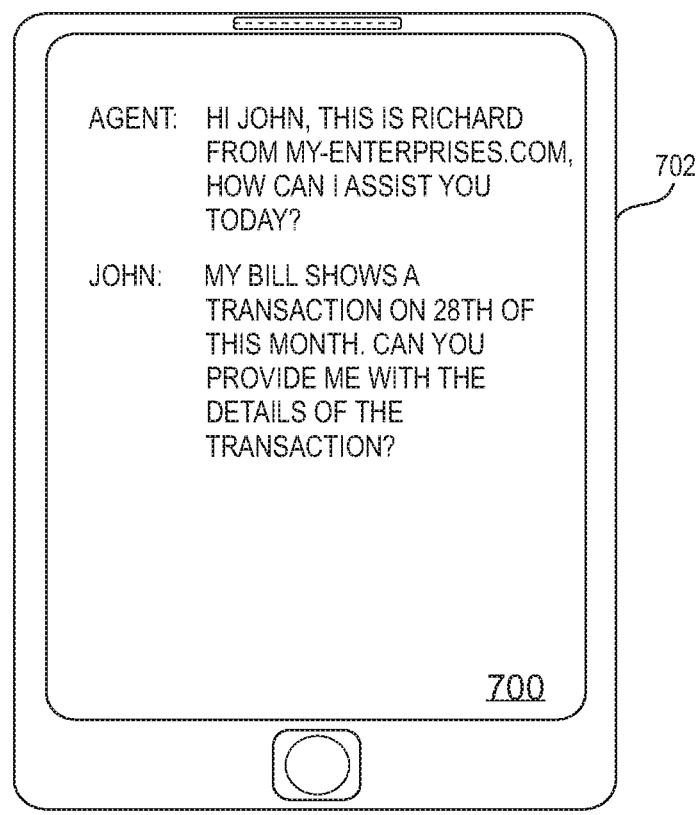
FIG. 7 shows a chat application UI displayed to a customer subsequent to provisioning of the notification informing the customer of the agent's availability, in accordance with an embodiment of the invention.

FIG. 7 shows a chat application UI 700 displayed to a customer subsequent to provisioning of the notification informing the customer of the agent's availability, in accordance with an embodiment of the invention. As explained above, the tracking module 406 of the apparatus 150 may be configured to continuously track if an agent is available for agent interaction and upon detecting an availability of an agent, the notification module 404 is configured to notify the customer, such as for example, by provisioning a notification like the notification 600 shown in FIG. 6. The notification module 404 in conjunction with the communication module 308 may further be configured to cause display of the chat application UI 700 on the screen of a customer's device 702. The chat application UI 700 is configured to facilitate a chat interaction between the customer and the agent.

In FIG. 7, the agent is exemplarily depicted to initiate an interaction with the customer with a statement 'Hi John, this is Richard from my-enterprises.com. How can I assist you today?' The customer may then respond with a query, such as for example, 'My bill shows a transaction on the $28^{th}$ of this month. Can you provide me with the details of the transaction?' The chat interaction may thereafter continue with the agent retrieving the desired information from the transaction database and provide the information to the customer. As can be seen, the customer does not have to spend time waiting for the agent to be available. The agent's availability is conveyed to the customer and moreover, the chat interaction is initiated as soon as the agent becomes available by switching the screen to the chat application UI 700, thereby improving an interaction experience for the user.

It is noted that the interaction with the agent may be facilitated on a different interaction channel (i.e. the second interaction channel), then the channel (i.e. the first interaction channel) used by the customer for provisioning the input. In an illustrative example, the first interaction channel may correspond to a native mobile application associated with the enterprise and the second interaction channel may correspond to one of a chat interaction channel and a voice interaction channel. Similarly, the interaction with the agent may be facilitated on an a different electronic device then the device used by the customer for provisioning the input.

In at least one example embodiment, the notification module 404 is configured to detect attention of the customer in at least one interaction channel from among a plurality of enterprise interaction channels. In an illustrative example, a request for accessing a Web page associated with a Website may be received at a Web server hosting the Website. For instance, a customer may enter a uniform resource locator (URL) associated with the Web page in a Web browser application to provision a hypertext transfer protocol (HTTP) request to the Web server for Web page access. In response to the HTTP request, the Web server may be configured to provision the Web page to the customer's device, which may then display the Web page in the UI associated with the Web browser application. The provisioning of the Web page (or Web pages) may be recorded at the Web server. As explained above, the communication module 308 of the apparatus 150 is operatively coupled with Web servers and other data gathering servers. The communication module 308 may receive notification of the customer's request and subsequent provisioning of the Web page from the Web server and thereby detect attention of the customer on the enterprise Website.

In another illustrative example, an invoking of a native mobile application related with the enterprise may trigger an application programming interface (API) call to the apparatus 150. As explained above, the communication module 308 is in operative communication with personal devices of the customers. The communication module 308 may receive the API call from the customer's device. The apparatus 150 may be caused to detect the attention of the customer in the native mobile application channel in response to the reception of the API call. The apparatus 150 may similarly track presence of customer in other interaction channels, such as social media channel, and the like.

In at least one example embodiment, the notification module 404 may be configured to select the interaction channel associated with the current attention of the customer as the second interaction channel for at least one of provisioning of the notification and facilitating interaction with the agent. The provisioning of the notification and/or facilitating of the interaction with the agent on a different interaction channel (i.e. the second interaction channel) then the interaction channel (i.e. the first interaction channel) used by the customer for provisioning the input seeking the interaction with the agent is exemplarily depicted in FIG. 8.

Figure 8:
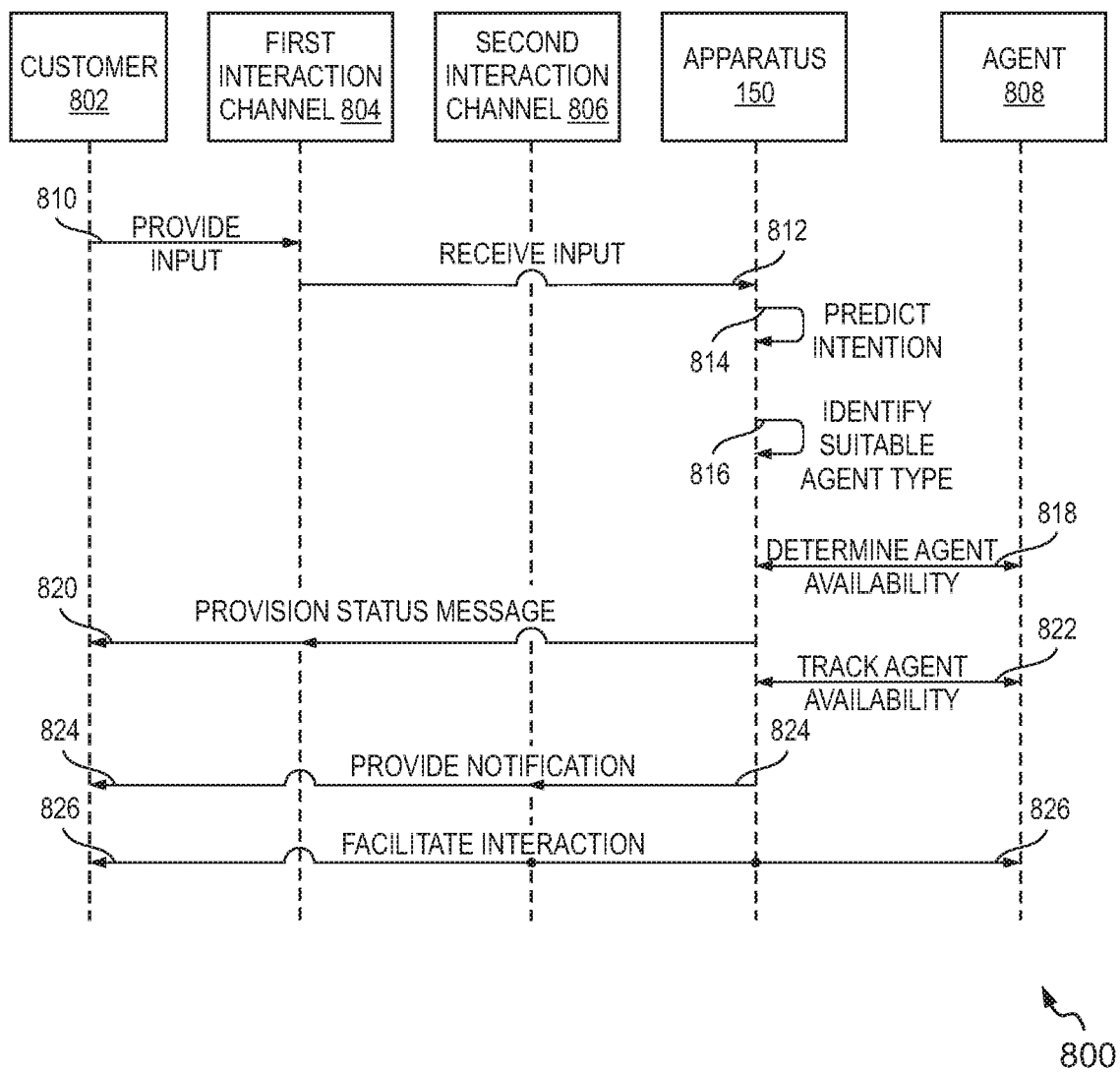
FIG. 8 is a representation of a sequence flow for illustrating a facilitating of interaction between a customer and an agent, in accordance with an embodiment of the invention.

FIG. 8 is a representation of a sequence flow 800 for illustrating a facilitating of interaction between a customer and an agent, in accordance with an embodiment of the invention. The representation of the sequence flow 800 depicts an example customer 802, an example first interaction channel 804, an example second interaction channel 806, the apparatus 150 as explained with reference to FIGS. 2 to 7, and an agent 808 associated with an enterprise. The term 'agent' as used herein refers to a customer service and support representative associated with the enterprise and capable of assisting customers with their respective queries.

At 810 of the sequence flow 800, the customer 802 provides an input indicative of the customer's desire to seek an interaction with the agent 808. The customer 802 provides the input on the first interaction channel 804. An example of the first interaction channel 804 is a native mobile application channel. The native mobile application may be associated with the enterprise and may be installed in the customer's electronic device. The native mobile application, upon being accessed, may display an option (for example, an option embodied as a widget, a hyperlink, a popup or an icon) capable of being selected by the customer to request an interaction with the agent. The customer 802 may provide a click or touch input on the option to provide the input indicative to the customer's desire to seek an interaction with the agent.

Another example of the first interaction channel 804 may be a Virtual Assistant (VA) application installed in the customer's electronic device. The customer 802 may provide a spoken input to request an interaction with the agent 808 associated with the enterprise.

At 812 of the sequence flow 800, the apparatus 150 receives the input from the first interaction channel 804 on account of being in operative communication with the first interaction channel 804.

At 814 of the sequence flow 800, the apparatus 150 is configured to predict a likely intention of the customer for requesting an interaction with the agent.

At 816 of the sequence flow 800, the apparatus 150 is configured to identify an agent of a suitable agent type for assisting the customer based on the prediction of the likely intention of the customer. In an example scenario, the agent 808 is identified as the agent with the suitable agent type for assisting the customer.

At 818 of the sequence flow 800, the apparatus 150 is configured to determine an availability of the agent 808. In an example scenario, it is determined that the agent 808 is not available for interaction with the customer 802.

At 820 of the sequence flow 800, the apparatus 150 is configured to provision a status message to the customer 802. The status message includes an estimate of waiting time for the interaction with the agent 808. The provisioning of the status message may be performed as explained with reference to FIG. 4 and is not explained again herein. The provisioning of the status message is exemplarily depicted to be provided using the first interaction channel 804. However, it is understood that the status message may be provided using any other interaction channel other than the first interaction channel. For example, if the input was provided using a native mobile application channel (i.e. the first interaction channel) then the apparatus 150 may cause a VA application to provide a spoken input to provide the status message to the customer 802.

At 822 of the sequence flow 800, the apparatus 150 tracks availability of the agent 808 at least for a time period equal to the estimate of waiting time.

At 824 of the sequence flow 800, the apparatus 150 is configured to provision a notification to the customer 802 using the second interaction channel 806 subsequent to determining that the agent 808 is available for interaction. In some embodiments, the apparatus 150 is configured to determine attention of the customer 802 in at least one enterprise interaction channel. Subsequent to determining attention of the customer 802 in an interaction channel, the apparatus 150 may be configured to select the interaction channel in which the customer is currently attentive as the second interaction channel 806 for provisioning the notification to the customer 802. In an illustrative example, the apparatus 150 may detect the customer's current attention in the chat interaction channel. Accordingly, the apparatus 150 may provision the notification in the chat interaction channel.

At 826 of the sequence flow 800, the apparatus 150 is configured to facilitate interaction, i.e. a chat interaction, between the customer 802 and the agent 808 using the second interaction channel 806.

The sequence flow 800 stops at 826.

Referring now to FIG. 2, in some embodiments, the apparatus 150 may also be caused to facilitate a provisioning, for example by using agents or directly through device APIs, of at least one of a personalized treatment and a preferential treatment to the customer based on the predicted intention of the customer. Some non-limiting examples of personalized treatment provisioned to the customer may include sending a self-serve link to the customer, sharing a knowledge base article, providing resolution to a customer query over an appropriate interaction channel, escalating or suggesting escalation of customer service level, offering a discount to the customer, recommending products to the customer for up-sell/cross-sell, proactively offering interaction, customizing the speed of interaction, customizing the speed of servicing information, deflecting interaction to a different interaction channel historically preferred by the customer and the like. Some non-limiting examples of preferential treatment provisioned to the customer may include routing an interaction to an agent with the best matching persona type, routing the interaction to a queue with the least waiting time, providing immediate agent assistance, etc. In at least some embodiments, the personalized treatment and/or the preferential treatment may be provisioned to the customer based on interaction data associated with past interactions of the customer with the enterprise on one or more interaction channels. For example, if the customer has historically preferred voice call interaction, then the current chat conversation may be deflected to a voice call interaction to provide a personalized interaction experience to the customer. In another illustrative example, if the customer has historically abandoned an interaction when the customer has been made to wait to speak to an agent, then the customer may be provisioned preferential treatment, for example, in form of immediate agent assistance or by routing the interaction to a queue with the least waiting time.

Figure 9:
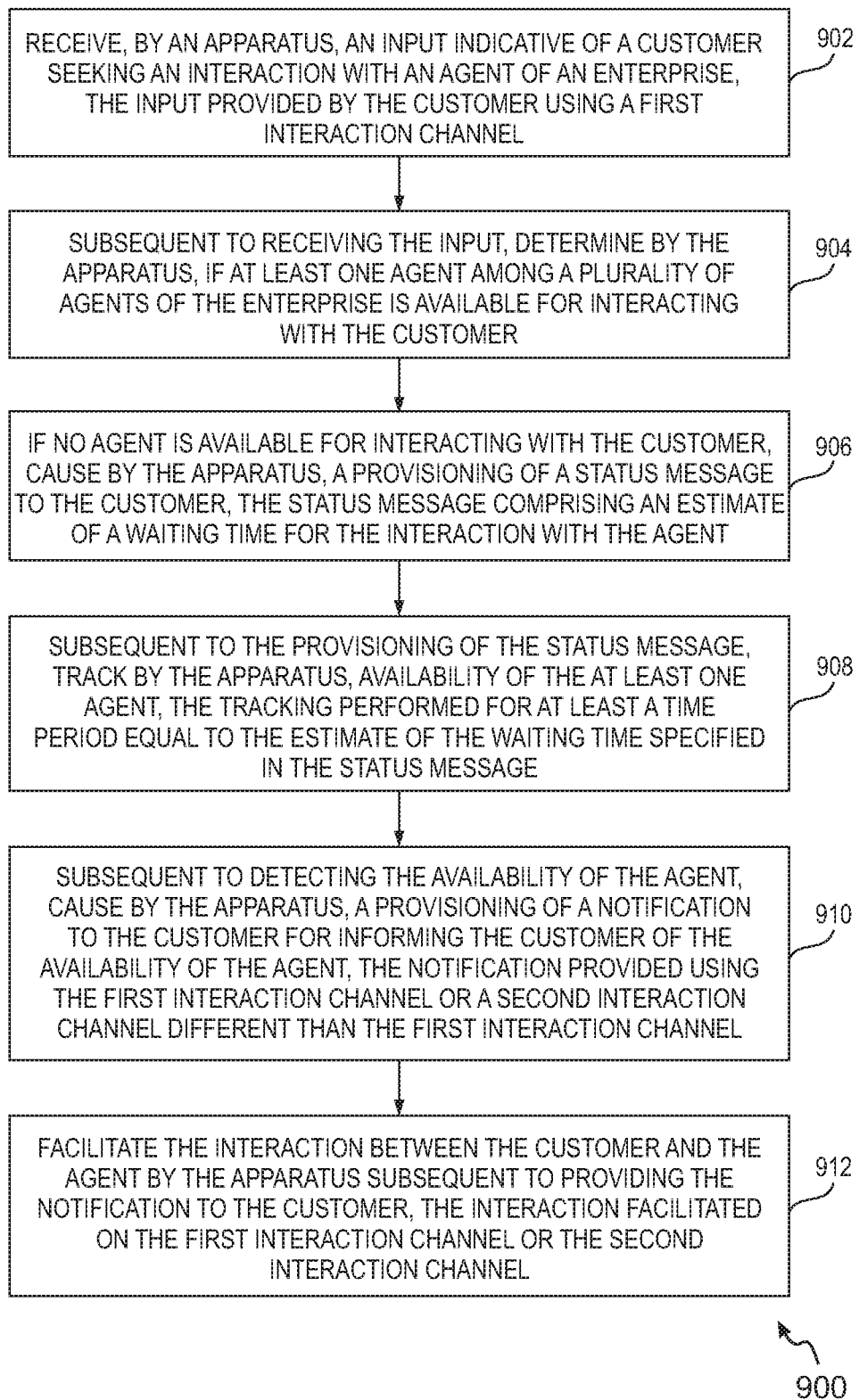
FIG. 9 is a flow diagram of an example method for notifying customers of agent availability, in accordance with an embodiment of the invention.

FIG. 9 is a flow diagram of an example method 900 for notifying customers of agent's availability, in accordance with an embodiment of the invention. The method 900 depicted in the flow diagram may be executed by, for example, the apparatus 150 explained with reference to FIGS. 2 to 7. Operations of the flowchart, and combinations of operation in the flowchart, may be implemented by, for example, hardware, firmware, a processor, circuitry and/or a different device associated with the execution of software that includes one or more computer program instructions. The operations of the method 900 are described herein with help of the apparatus 150. It is noted that, the operations of the method 900 can be described and/or practiced by using a system other than the apparatus 150. The method 900 starts at operation 902.

At operation 902 of the method 900, an input indicative of a customer seeking an interaction with an agent of an enterprise is received by an apparatus, such as the apparatus 150. As explained with reference to FIG. 1, customers of the enterprise may wish to interact with the agents for a variety of reasons, such as to receive additional information about a service, to troubleshoot a product feature, to resolve a billing dispute, and the like. The enterprise channels, such as the enterprise Websites and the native mobile applications typically facilitate interaction with an agent by displaying an option such as a widget, which upon being accessed by a customer enables a chat or, in some cases, a voice interaction, with the agent. An example widget is shown in FIG. 1.

The input is provided by the customer using a first interaction channel. In one embodiment, the first interaction channel corresponds to a native mobile application associated with the enterprise. In one embodiment, the first interaction channel corresponds to an enterprise Website. In case of the first interaction channel being a native mobile application or an enterprise Website, the input may be embodied as a touch or a click input on a widget, such as the widget 106 shown in FIG. 1. In one embodiment, the first interaction channel corresponds to a voice channel. For example, the customer may provide a spoken input to a Virtual Assistant (VA) on the customer's electronic device to seek agent assistance.

At operation 904 of the method 900, subsequent to receiving the input, it is determined by the apparatus whether at least one agent among a plurality of agents of the enterprise is available for interacting with the customer. In some embodiments, prior to determination of the availability of the agent, an intention of the customer to seek interaction with the agent is predicted. In at least one example embodiment, an agent type suitable for handling the interaction with the customer is identified based on the predicted intention of the customer. The suitable agent type may correspond to an agent type associated with specialized skill in handling interactions related to the intention of the customer. In some embodiments, the suitable agent type may correspond to an agent type associated with persona matching a persona of the customer. The prediction of the customer's intention and the identification of the suitable agent type may be performed as explained with reference to FIGS. 3 and 4 and is not explained again herein. Thereafter, the apparatus may be configured to determine availability of an agent of suitable agent-type. If an agent is available for interaction, then in response to the customer's input seeking interaction with an agent, a chat application UI may be displayed to the customer for facilitating chat interaction between the customer and the agent. However, in many example scenarios, an agent may not be available for interaction with the customer.

At operation 906 of the method 900, a provisioning of a status message to the customer is caused if no agent is available for interacting with the customer. In one embodiment, the status message includes an estimate of a waiting time for the interaction with the agent. More specifically, the status message is configured to provide an estimate of time at which an agent will be available for interacting with the customer. In one embodiment, the status message may be provided as a text-based message on the customer's device screen. Alternatively, in some embodiments, the VA may take over the communication and provide a spoken input to the customer informing the customer of the current unavailability of the agent as depicted in FIG. 5.

At operation 908 of the method 900, subsequent to provisioning of the status message, availability of the at least one agent is tracked by the apparatus. The tracking performed for at least a time period equal to the estimate of the waiting time specified in the status message. For example, if the estimate of the waiting period specified in the status message is three minutes, then the apparatus may be configured to track the availability of the agent for at least three minutes. In at least some embodiments, the availability of the agent may be continued to be tracked till an agent is available. Further, if the agent may only be available after a time period greater than the estimate of the waiting time specified in the status message, then another status message may be provisioned to the customer to inform the customer of the additional time required for the interaction to be initiated.

At operation 910 of the method 900, a provisioning of a notification to the customer for informing the customer of the availability of the agent is caused subsequent to detecting the availability of the agent. An example notification provided to the customer upon detecting agent's availability is explained with an illustrative example in FIG. 6 and is not explained again herein.

At operation 912 of the method 900, the interaction between the customer and the agent is facilitated by the apparatus subsequent to providing the notification to the customer. The interaction is facilitated on the first interaction channel or the second interaction channel. An example facilitating of the interaction between the customer and the agent is explained with an illustrative example in FIG. 7 and is not explained again herein.

It is noted that the interaction with the agent may be facilitated on a different interaction channel (i.e. the second interaction channel), then the channel (i.e. the first interaction channel) used by the customer for provisioning the input. In an illustrative example, the first interaction channel may correspond to a native mobile application associated with the enterprise and the second interaction channel may correspond to one of a chat interaction channel and a voice interaction channel. Similarly, the interaction with the agent may be facilitated on an a different electronic device then the device used by the customer for provisioning the input.

In at least one example embodiment, the apparatus is configured to detect attention of the customer in at least one interaction channel from among a plurality of enterprise interaction channels. In at least one example embodiment, the apparatus may be configured to select the interaction channel associated with the attention of the customer as the second interaction channel for at least one of provisioning of the notification and facilitating the interaction between the customer and the agent.

Without in any way limiting the scope, interpretation, or application of the claims appearing below, advantages of one or more of the exemplary embodiments disclosed herein provide numerous advantages. The techniques disclosed herein suggest techniques for notifying customers of the agent's availability. The customers do not have to wait after the agent is determined to be unavailable. The customer can continue to attend to other tasks. Once the agent is available, the customer is notified and moreover a chat interaction is initiated on the screen of the customer's device, thereby greatly improving an interaction experience of the customer. The customers, in such a scenario, do not have to endure frustrating waiting periods for connecting with the agent.

Further, as explained with reference to some embodiments, the customer's intention may be predicted based on the journey information related to customer's recent visits on the enterprise interaction channels, or based on recent transactions/interactions, and accordingly, the agent may pre-empt the customer's query and provide customized assistance to the customer. Moreover, in some embodiments, the notification may be provided to the customer based on stored preferences for receiving notifications provided by the customer.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution apparatus, as described and depicted in FIGS. 3 and 4. A computer-readable medium may comprise a computer-readable storage medium that may be any media or means that can contain or store the instructions for use by or in connection with an instruction execution system, system, or device, such as a computer.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 150, the processor 302 and its various components, the memory 304, the I/O module 306 and the communication module 308 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIG. 9). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method comprising:
receiving, by a processor, an input indicative of a customer seeking an interaction with an agent of an enterprise, the input provided by the customer using a first interaction channel;
responsive to said received input, said processor predicting, using a prediction model, an intention of the customer for seeking the interaction with the agent based on a current journey and past journeys of the customer on interaction channels associated with the enterprise, wherein the predicting comprises (1) normalizing interaction data related to the current journey and the past journeys of the customer into one or more dusters; (2) extracting feature vectors from one or more dusters of the normalized data based on co-occurrence of terms or a contiguous sequence of terms; and (3) determining a prediction of the intention based on classifying the feature vectors, said classifying comprising one or more models based on logistic regression, an artificial neural network (ANN), and a Support Vector Machine (SVM) with Platt scaling:
subsequent to predicting the intention, said processor determining if at least one agent among a plurality of agents of the enterprise is available for interacting with the customer based on the prediction;
if no agent is available for interacting with the customer, said processor provisioning a status message to the customer, the status message comprising an estimate of a waiting time for the interaction with the agent;
subsequent to the provisioning of the status message, said processor tracking availability of the at least one agent, the tracking performed for at least a time period equal to the estimate of the waiting time specified in the status message;
subsequent to detecting the availability of the agent, said processor provisioning a notification to the customer informing the customer of the availability of the agent, the notification provided using the first interaction channel or a second interaction channel different than the first interaction channel;
wherein responsive to said provisioning the processor:
with a Virtual Assistant (VA) in an electronic device associated with the customer, provisioning the status message in form of a spoken input to the customer, and/or
displaying a chat application user interface (UI) on a display screen of an electronic device associated with the customer for establishing the interaction between the customer and the agent; and
establishing the interaction between the customer and the agent by the processor subsequent to providing the notification to the customer, the interaction established on the first interaction channel or the second interaction channel.

2. The method as claimed in claim 1, wherein the first interaction channel corresponds to a native mobile application associated with the enterprise and, wherein the second interaction channel corresponds to one of a chat interaction channel and a voice interaction channel.

3. The method as claimed in claim 1, wherein the interaction with the agent is established on an electronic device different than a device used by the customer for provisioning the input.

4. The method as claimed in claim 1, further comprising:
detecting, by the apparatus, attention of the customer in at least one interaction channel from among a plurality of enterprise interaction channels, wherein an interaction channel associated with the attention of the customer is selected as the second interaction channel for at least one of provisioning of the notification and facilitating the interaction with the agent.

5. The method as claimed in claim 1, further comprising:
identifying, by the apparatus, an agent type suitable for handling the interaction with the customer, wherein the identification of the suitable agent type is performed based on the predicted intention of the customer.

6. The method as claimed in claim 5, wherein the suitable agent type corresponds to an agent type associated with specialized skill in handling interactions related to the intention of the customer.

7. The method as claimed in claim 5, wherein the suitable agent type corresponds to an agent type associated with persona matching a persona of the customer.

8. The method as claimed in claim 1, wherein the notification is provided to the customer based on a customer preference for receiving notifications.

9. An apparatus comprising:
a memory for storing instructions; and
a processor configured to execute the instructions and thereby cause the apparatus to perform at least:
receive an input indicative of a customer seeking an interaction with an agent of an enterprise, the input provided by the customer using a first interaction channel;
predict, using a prediction model, an intention of the customer for seeking the interaction with the agent, the intention predicted based on at least one of a current journey and past journeys of the customer on interaction channels associated with the enterprise, wherein the intention is predicted based on (1) normalizing interaction data related to the current journey and the past journeys of the customer into one or more clusters; (2) extracting feature vectors from one or more clusters of the normalized data based on co-occurrence of terms or a contiguous sequence of terms; and (3) determining a prediction of the intention based on classifying the feature vectors, said classifying comprising one or more models based on logistic regression, an artificial neural network (ANN), and a Support Vector Machine (SVM) with Platt scaling;
subsequent to receiving the input, determine if at least one agent among a plurality of agents of the enterprise is available for interacting with the customer;
if no agent is available for interacting with the customer, cause a provisioning of a status message to the customer, the status message comprising an estimate of a waiting time for the interaction with the agent;
subsequent to the provisioning of the status message, track availability of the at least one agent, the tracking performed for at least a time period equal to the estimate of the waiting time specified in the status message;
subsequent to detecting the availability of the agent, cause a provisioning of a notification to the customer for informing the customer of the availability of the agent, the notification provided using the first interaction channel or a second interaction channel different than the first interaction channel;

wherein the apparatus:
with a Virtual Assistant (VA) in an electronic device associated with the customer, provisions the status message in form of a spoken input to the customer; and/or
displays a chat application user interface (UI) on a display screen of an electronic device associated with the customer for establishing the interaction between the customer and the agent; and
establish the interaction between the customer and the agent subsequent to providing the notification to the customer, the interaction established on the first interaction channel or the second interaction channel.

10. The apparatus as claimed in claim 9, wherein the first interaction channel corresponds to a native mobile application associated with the enterprise and, wherein the second interaction channel corresponds to one of a chat interaction channel and a voice interaction channel.

11. The apparatus as claimed in claim 9, wherein the apparatus is further caused to identify an agent type suitable for handling the interaction with the customer, wherein the identification of the suitable agent type is performed based on the predicted intention of the customer.

12. A computer-implemented method comprising:
receiving, by a processor, an input indicative of a customer seeking an interaction with an agent of an enterprise, the input provided by the customer using a native mobile application on an electronic device associated with the customer;
predicting, by the processor using a prediction model, an intention of the customer for seeking the interaction with the agent; the intention predicted based on at least one of a current journey and past journeys of the customer on interaction channels associated with the enterprise, wherein the predicting comprises (1) normalizing interaction data related to the current journey and the past journeys of the customer into one or more dusters; (2) extracting feature vectors from one or more dusters of the normalized data based on co-occurrence of terms or a contiguous sequence of terms; and (3) determining a prediction of the intention based on classifying the feature vectors, said classifying comprising one or more models based on logistic regression, an artificial neural network (ANN), and a Support Vector Machine (SVM) with Platt scaling;
subsequent to receiving the input, determining by the processor, if at least one agent among a plurality of agents of the enterprise is available for interacting with the customer;
if no agent is available for interacting with the customer, causing by the processor, a provisioning of a status message to the customer in form of a spoken input, the status message comprising an estimate of a waiting time for the interaction with the agent;
subsequent to the provisioning of the status message, tracking by the processor, availability of the at least one agent, the tracking performed for at least a time period equal to the estimate of the waiting time specified in the status message;
subsequent to detecting the availability of the agent, causing by the processor, provisioning of a notification to the customer for informing the customer of the availability of the agent, the notification provided using a different interaction channel than the native mobile application channel;

wherein responsive to said provisioning the processor:
- with a Virtual Assistant (VA) in an electronic device associated with the customer, provisioning the status message in form of a spoken input to the customer, and/or
- displaying a chat application user interface (UI) on a display screen of an electronic device associated with the customer for establishing the interaction between the customer and the agent; and establishing, by the processor the interaction between the customer and the agent.

13. The method as claimed in claim 12, further comprising:
- identifying, by the apparatus, an agent type suitable for handling the interaction with the customer, wherein the identification of the suitable agent type is performed based on the predicted intention of the customer.

* * * * *